United States Patent
Takeda

[19]

[11] Patent Number: 6,108,487
[45] Date of Patent: Aug. 22, 2000

[54] SHUFFLE ENCODED VIDEO DATA RECORDING AND REPRODUCTION

[75] Inventor: Takayuki Takeda, Bagshot, United Kingdom

[73] Assignees: Sony Corporation, Tokyo, Japan; Sony United Kingdom Limited, Weybridge, United Kingdom

[21] Appl. No.: 08/903,959

[22] Filed: Jul. 31, 1997

[51] Int. Cl.[7] .............................. H04N 5/926; H04N 5/91
[52] U.S. Cl. .......................... 386/124; 386/46; 386/123; 386/122
[58] Field of Search ................. 386/2, 37, 40, 386/92, 98, 113, 46, 122, 123, 124, 111–112; 360/32; H04N 5/926, 5/91

[56] References Cited

U.S. PATENT DOCUMENTS

| | | | |
|---|---|---|---|
| 4,811,123 | 3/1989 | Yoshinaka | 360/26 |
| 5,341,250 | 8/1994 | Uchida et al. | 360/48 |
| 5,499,144 | 3/1996 | Inoue et al. | 360/10.3 |
| 5,543,928 | 8/1996 | Takakura | 386/124 |
| 5,550,640 | 8/1996 | Tsuboi et al. | 358/335 |
| 5,739,968 | 4/1998 | Inoue et al. | 386/78 |
| 5,790,747 | 8/1998 | Kanota et al. | 386/124 |
| 5,926,610 | 7/1999 | Sugiyama et al. | 386/111 |
| 5,926,612 | 7/1999 | Gillard et al. | 386/124 |

*Primary Examiner*—Wendy Garber
*Assistant Examiner*—Vincent F. Boccio
*Attorney, Agent, or Firm*—Frommer Lawrence & Haug, LLP.; William S. Frommer

[57] ABSTRACT

Video data recording apparatus for recording video data representing successive video images comprises a tape recording system in which video data is recorded on successive tracks of a tape recording medium, video data representing each image occupying a predetermined plurality (n) of successive tracks; and a data shuffler for shuffling the video data according to a shuffle pattern, for recording on the successive tracks of the tape recording medium, so that video data representing each of a plurality of sub-areas of an image is recorded in respective parts on all n tracks occupied by that image, at respective track positions so that corresponding positions along pairs of adjacent tracks are occupied by data representing different ones of the plurality of sub-areas.

13 Claims, 17 Drawing Sheets

| AM | No OF BITS AVAILABLE FOR EACH AC |
|----|-----------------------------------|
| 00 | 0 |
| 01 | 1 |
| 10 | 2 |
| 11 | 3 |
FIG. 8
| AC | 6 | 4 | 2 | 0 | 1 | 3 | 5 | 7 |
|----|---|---|---|---|---|---|---|---|
| Q_mod | -14 | -10 | -6 | -2 | 2 | 6 | 10 | 14 |
FIG. 9
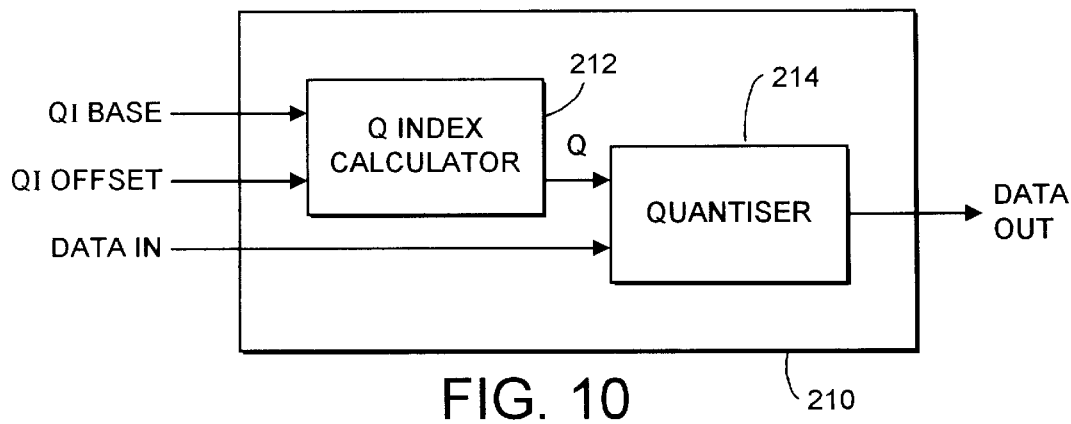
FIG. 10
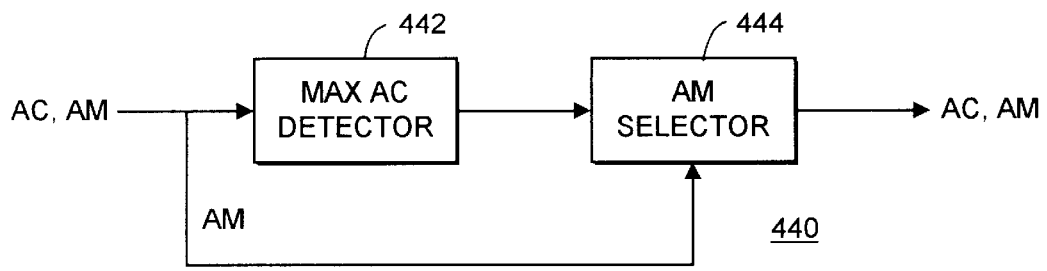
FIG. 11

| INITIAL AM | MAX AC VALUE | OPTIMISED AM |
|---|---|---|
| 11 (3 BIT ACs) | 3 | 10 |
| | 2 | 10 |
| | 1 | 01 |
| | 0 | 00 |
| 10 (2 BIT ACs) | 1 | 01 |
| | 0 | 00 |
| 01 (1 BIT ACs) | 0 | 00 |

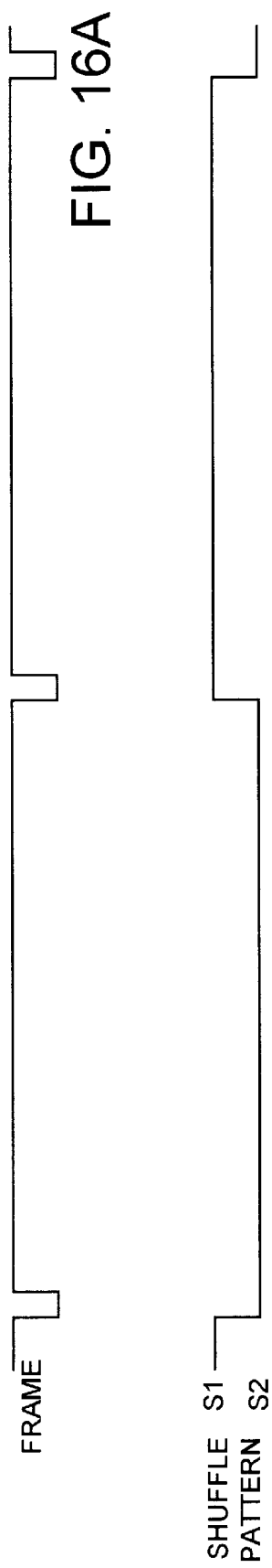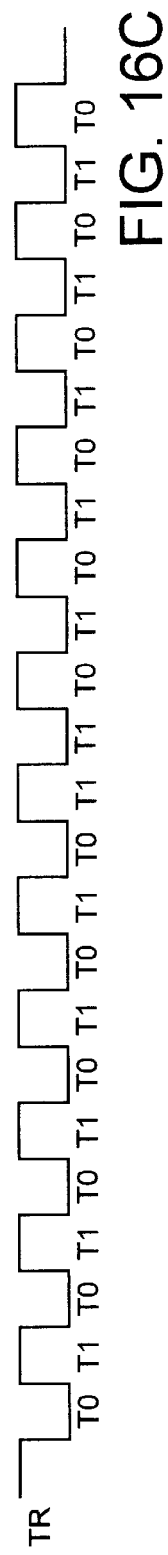

| 610 | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 |
| S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 |
| S5 | S4 | S2 | S3 | S0 | S1 | S5 | S4 | S2 | S3 | S0 | S1 | S5 | S4 | S2 | S3 | S0 | S1 | S5 | S4 | S2 | S3 | S0 | S1 | S5 | S4 | S2 | S3 | S0 | S1 |
| S1 | S0 | S4 | S5 | S3 | S2 | S1 | S0 | S4 | S5 | S3 | S2 | S1 | S0 | S4 | S5 | S3 | S2 | S1 | S0 | S4 | S5 | S3 | S2 | S1 | S0 | S4 | S5 | S3 | S2 |
| S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 |
| S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 |
| S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 |
| S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 |
| S5 | S4 | S2 | S3 | S0 | S1 | S5 | S4 | S2 | S3 | S0 | S1 | S5 | S4 | S2 | S3 | S0 | S1 | S5 | S4 | S2 | S3 | S0 | S1 | S5 | S4 | S2 | S3 | S0 | S1 |
| S1 | S0 | S4 | S5 | S3 | S2 | S1 | S0 | S4 | S5 | S3 | S2 | S1 | S0 | S4 | S5 | S3 | S2 | S1 | S0 | S4 | S5 | S3 | S2 | S1 | S0 | S4 | S5 | S3 | S2 |
| S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 |
| S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 |

T1

| S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 |
|---|---|---|---|---|---|---|---|---|---|---|---|---|---|---|---|---|---|---|---|---|---|---|---|---|---|---|---|---|---|
| S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 |
| S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 |
| S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 |
| S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 |
| S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 |
| S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 |
| S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 |
| S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 |
| S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 |
| S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 | S5 | S4 | S3 | S2 | S1 | S0 |
| S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 | S0 | S1 | S4 | S5 | S2 | S3 |

FIG. 18A

SPATIAL ERROR PATTERN

FRAME A

FRAME B

SPATIAL ERROR PATTERN

FRAME A

FRAME B

SHUFFLE ENCODED VIDEO DATA RECORDING AND REPRODUCTION

BACKGROUND OF THE INVENTION

1. Field of the Invention

This invention relates to apparatus, methods and media for video data recording and reproduction.

2. Description of the Prior Art

In many video data recording systems, video data (possibly after a stage of data compression) is recorded onto successive obliquely scanned parallel tacks on a recording tape medium.

If the data is recorded onto the tape tracks in the same order in which the data appears in the original picture, then a tape error such as a scratch or a dropout can lead to the loss of many adjacent pixels forming a contiguous area of the image. The fact that such a contiguous area has been lost makes it very difficult to use error concealment techniques which rely on interpolating missing pixel values from temporally or spatially surrounding (correct) pixel values.

In order to address this problem, so-called data shuffling has been proposed, whereby adjacent sections of data on a tape track represent non-adjacent areas in the image. So, if a tape error causes the loss of a number of such adjacent track sections, the shuffling arrangement translates this into a loss of several widely-spaced image areas which are surrounded by error-free pixels. In this way, data concealment can still be used.

It is an object of the invention to provide an improved data shuffling technique to provide increased immunity against data errors on tape replay.

SUMMARY OF THE INVENTION

This invention provides video data recording apparatus for recording video data representing successive video images, the apparatus comprising:

a tape recording system in which video data is recorded on successive tracks of a tape recording medium, video data representing each image occupying a predetermined plurality (n) of successive tracks; and a data shuffler for shuffling the video data according to a shuffle pattern, for recording on the successive tracks of the tape recording medium, so that video data representing each of a plurality of sub-areas of an image is recorded in respective parts on all n tracks occupied by that image, at respective track positions so that corresponding positions along pairs of adjacent tracks are occupied by data representing different ones of the plurality of sub-areas.

In the invention, data representing each sub-area of a single image (e.g. a video field or frame) is split between all of the tracks occupied by that image, giving increased immunity to short replay errors. Corresponding positions along adjacent tracks are not occupied by data from the same sub-area, again giving improved immunity to data errors.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 is a table showing the quantities of data required for different activity modes;

FIG. 9 is a table showing the effect of activity codes on the applied degree of quantisation;

FIG. 10 is a schematic diagram of a quantiser;

FIG. 11 schematically illustrates a part of a bit allocator;

FIG. 13 illustrates the data format of a sync block;

FIGS. 16a to 16d are schematic timing diagrams illustrating the recording of compressed image data signals on to a tape medium;

FIG. 18a schematically illustrates the division of the two subsampled data streams into segments;

DESCRIPTION OF THE PREFERRED EMBODIMENTS

Figure 1:
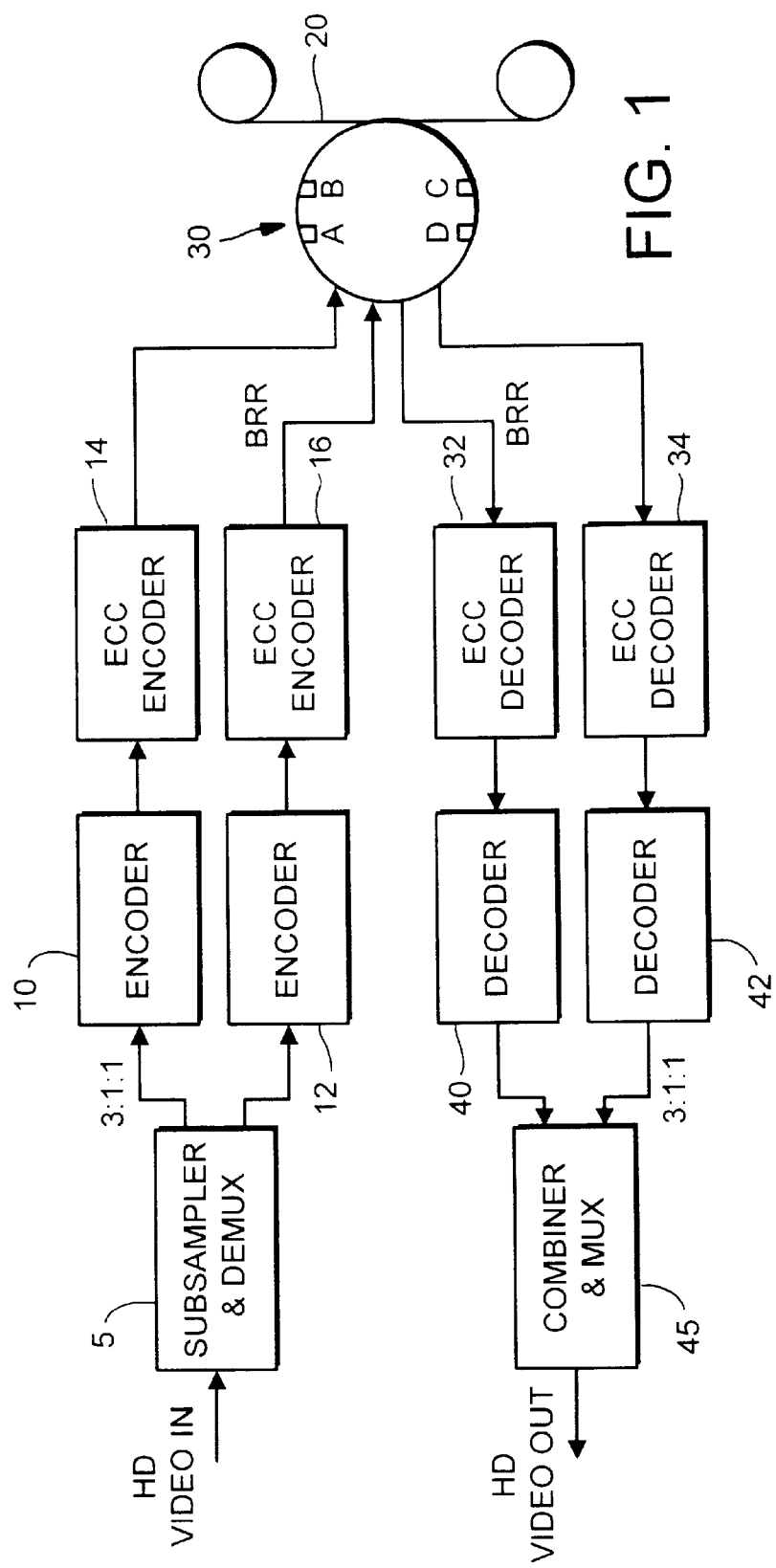
FIG. 1 is a schematic diagram of a bit-rate reducing encoder and a corresponding decoder for use with a magnetic tape channel.

FIG. 1 is a schematic diagram of a tape recording and reproducing system comprising a subsampler and demultiplexer 5, a pair of bit-rate reducing encoders 10, 12, error correction (ECC) encoders 14, 16, a tape channel 20, tape recording and reproducing apparatus (including rotary magnetic heads A . . . D) 30, error correction decoders 32, 34, a pair of corresponding data decoders 40, 42, and a combiner and multiplexer 45.

The subsampler and demultiplexer 5 receives an input 4:2:2 format high definition video signal, subsamples it to a 3:1:1 format and divides the resulting data into two for parallel processing by the encoders 10, 12. The encoders 10, 12 are identical, and each generate a bit-rate reduced (BRR) signal for recording on the tape medium. Similarly, the decoders 40, 42 receive BRR signals reproduced from the tape medium and decode the BRR signals to form respective portions of an output 3:1:1 video signal. The combiner and multiplexer 45 recombines these portions to form the output high definition video signal.

Figure 2:
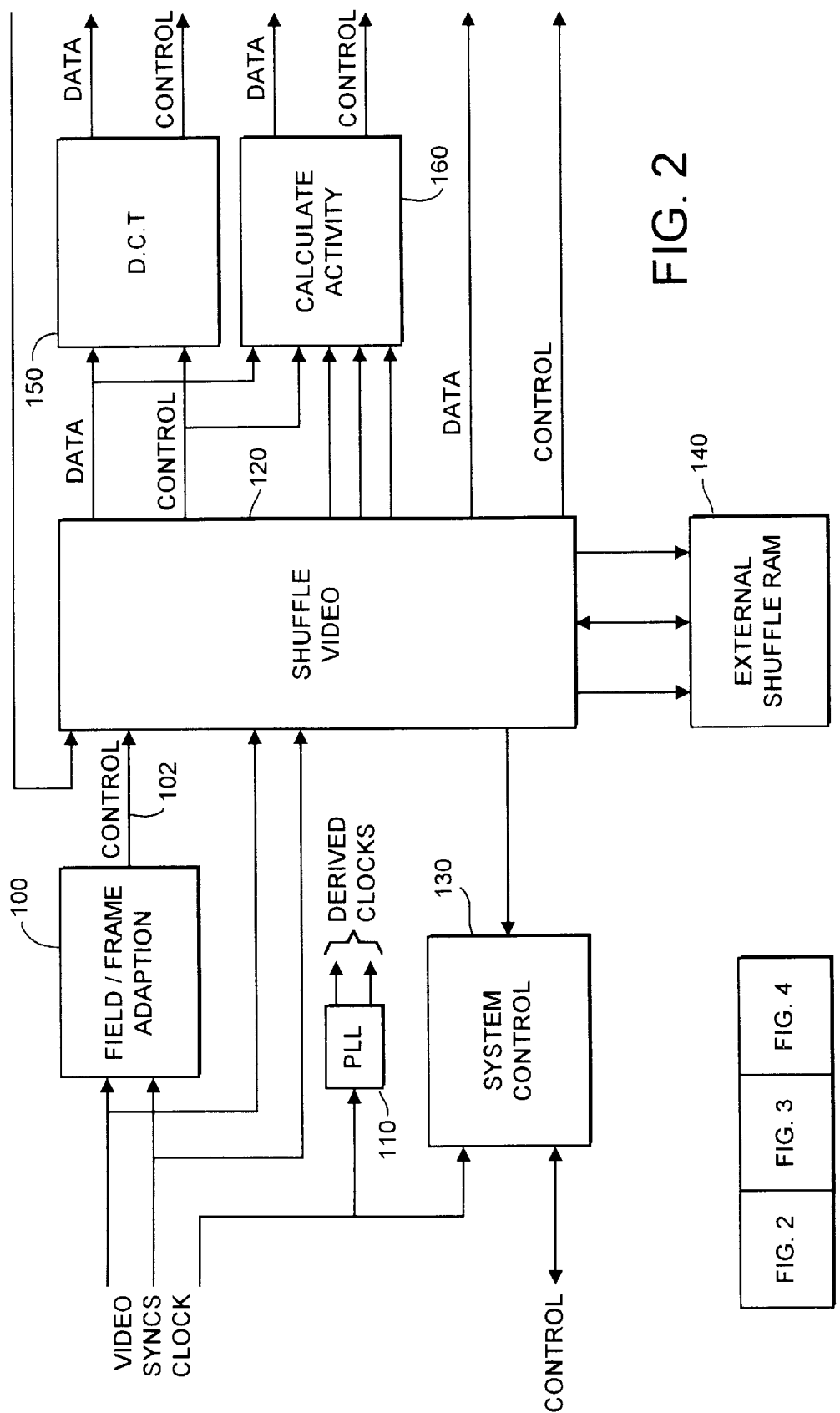
FIGS. 2 to 4 schematically illustrate the bit-rate reducing encoder of FIG. 1.

Referring now to FIG. 2, the input video signal to the encoder, in the so-called 3:1:1 format ($Y_0$ $Y_1$ $Y_2$ $C_b$ $C_r$ etc), a horizontal sync signal and a 46.4 MHz video clock are supplied to a field/frame adaption circuit 100, a phase lock loop 110, a video shuffler 120 and a system controller 130.

The field/frame adaption circuit 100 is used to control switching of the encoder between a frame-based mode of operation and a field-based mode of operation. This switching occurs at a scene change, so that a field-based mode of operation is used for the frame of a scene change.

In order to detect a scene change in the input video signal, the field/frame adaption circuit 100 divides each input field into 16 blocks, each being 300 pixels by 135 lines. The dc level and variance of each block for each field are then calculated as follows:

$$dc = \sum (\text{pixel value})$$
$$\text{variance} = \sum (\text{pixel value})^2$$

The variance of the blocks is then normalised as follows:

$$\text{normalised variance} = \sum (\text{pixel value})^2 / \sum (\text{pixel value})$$

The dc level and variance for each block of the two fields comprising a single frame are then compared (on a block-by-corresponding-block basis) to detect whether the two fields are considered to be similar. The following relationships are used to make this detection:

$$\text{if} \quad dc_{fld1} \times dc_{\text{lower threshold}} > dc_{fld0} \quad (a)$$
$$\text{and} \quad dc_{fld1} \times dc_{\text{upper threshold}} < dc_{fld0}$$

then $dc_{fld1}$ is considered to be similar to $dc_{fld0}$ $$\text{if} \quad var_{fld1} \times var_{\text{lower threshold}} > var_{fld0} \quad (b)$$
$$\text{and} \quad var_{fld1} \times var_{\text{upper threshold}} < var_{fld0}$$

then $var_{fld1}$ is considered to be similar to $var_{fld0}$

The number of dc and variance blocks that are similar between the two fields are then compared to separate thresholds:

$$\text{if number\_similar}_{\text{dc blocks}} > \text{dc blocks threshold}$$
$$\text{and number\_similar}_{\text{var blocks}} > \text{varblock threshold}$$

then the two fields are considered to be part of the same video scene.

The result of this detection is supplied on a control output 102 from the field/frame adaption circuit 100.

The PLL 110 receives the 46.4 MHz clock supplied to the encoder and derives other clock signals required by the encoder apparatus from that clock signal.

The system controller 130 controls the apparatus to operate in the manner described.

The video shuffler 120 receives pixels of the input video signal and stores them temporarily in an external shuffle RAM 140. It then reads blocks of pixels from the external shuffle RAM according to a predetermined shuffle pattern so that blocks of pixels which are adjacent in the image are not read out at adjacent positions in the shuffle pattern.

The reason for this measure is to try to alleviate the effect of data losses (e.g. due to a tape drop-out or similar) on the picture reconstructed by the decoder apparatus. Because pixel blocks which are adjacent in the image are separated from one another in the resulting bit stream (because they are shuffled by the video shuffler 120), a short duration data loss might affect a number of pixel blocks but not their immediate neighbours in the image. This allows data concealment to be used to reconstruct the missing blocks.

The current frame is written to the external RAM while the previous frame is read, in a shuffled manner, from the external RAM.

Figure 3:
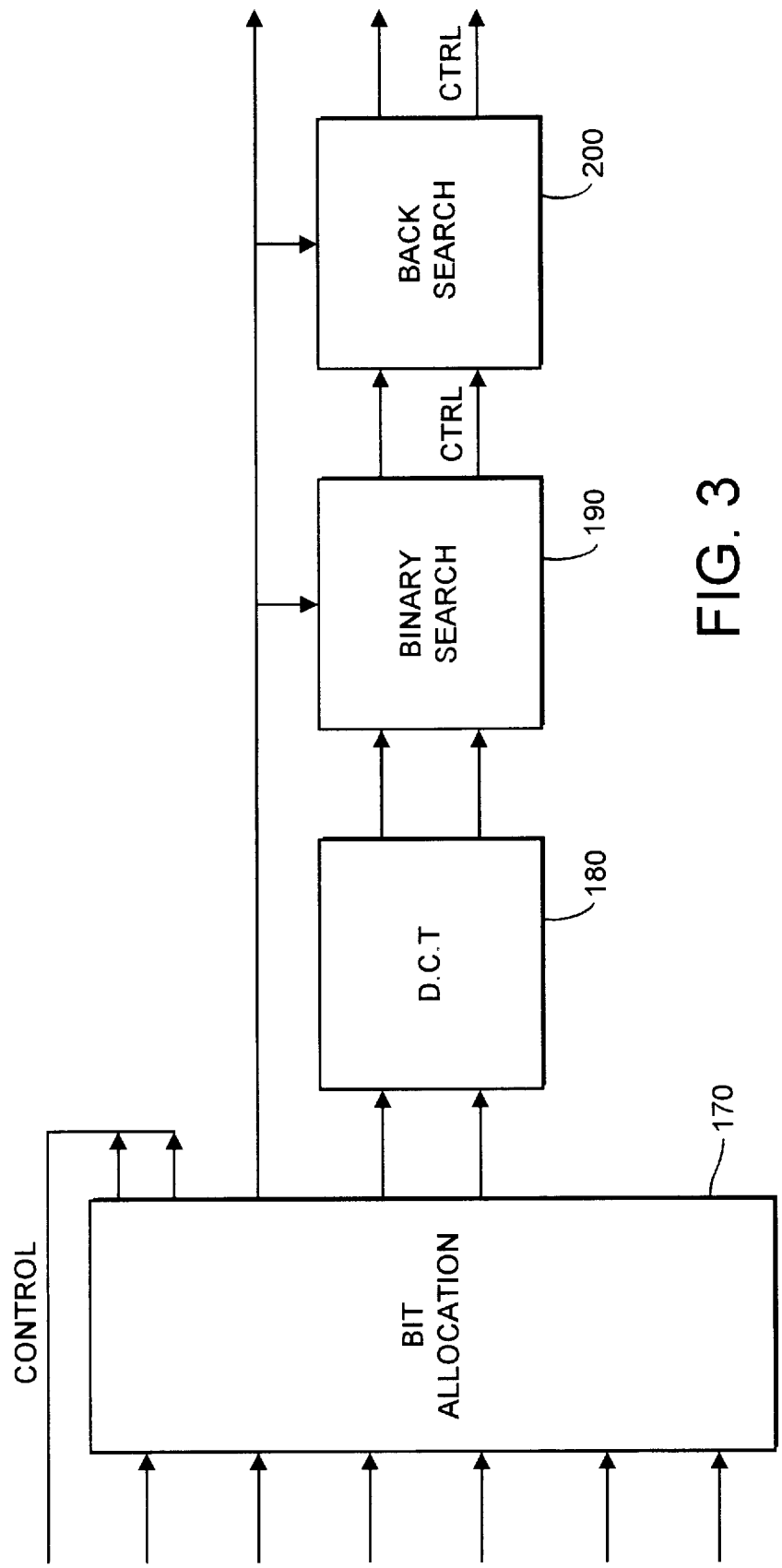

The shuffled data from the video shuffler 120 is supplied to a discrete cosine transform (DCT unit 150), an activity calculator 160 and (referring to FIG. 3) a bit allocator 170.

The DCT unit 150 transform each pixel block supplied from the video shuffler 120 into a corresponding block of DCT coefficients using known techniques. These coefficients are supplied to the bit allocator 170.

The activity calculator 160 generates so-called "activity codes" and corresponding offsets to be applied to the quantisation index for each block of data. These codes specify the so-called activity of each block, assessed according to the following principles:

(i) a block containing more detail (measured for example by the variance of the pixel values within the block) has a higher activity than a block having less detail;

(ii) a block predominantly containing colours associated with skin tones is quantised less harshly (i.e. given a lower notional activity) than a block predominantly not containing such colours;

(iii) a block having a very low or a very high average luminance level is quantised more harshly (i.e. given a higher notional activity) than a block having a mid-range average luminance level (Weber's law). For example, if a block's average luminance level is above 224 or below 32 (in an eight bit system) then a constant value is added to the calculation of the block's activity. If the block's average luminance level is between 32 and 224 then the activity calculation is unaltered.

In general, the activity codes are used to control the later operation of the encoder, so that pixel blocks having a higher activity are subjected to harsher compression, since it is less likely that the viewer would spot compression artifacts in that block when the block is subsequently decompressed. Blocks having a low activity, e.g. relatively "smooth" surfaces, relatively dark areas or areas having colours corresponding to skin tones, are compressed less harshly, since the user is more likely to spot compression artifacts in those areas.

The quantisation index offsets are embedded in the bitstream, whereas the activity codes (which are needed to specify the quantisation offsets to be used on decoding) are supplied separately for possible "optimisation"—see below.

The bit allocator 170 receives DCT data from the DCT encoder 150 and activity data from the activity calculator 160. The bit allocator 170 performs a trial quantization of the DCT data, followed by a trial part of an entropy encoding process.

Using these techniques, the bit allocator calculates the number of bits which would be required to encode each DCT block at one of ten quantization "base" values: 7, 13, 19, 25, 31, 37, 43, 49, 55 and 61, subject to each block's quantisation index offset calculated by the activity calculator. Ultimately, the quantization level for each block is selected to a resolution of 1 (using the scale given above), but for the purposes of the bit allocator 170, the quantization base value is assessed to the nearest 6 on that scale.

At the output of the bit allocator, therefore, a figure derived from the nearest appropriate quantization base level from the selection given above is passed, together with a delayed version of the video data, to a further DCT unit 180, a binary search unit 190 and a backsearch unit 200. This process will be described further below, but in brief, a value 2 greater than the quantisation value giving just over the required bit rate is passed by the bit allocator.

The further DCT unit 180 again calculates DCT coefficients, this time based on the delayed version of the video data.

The binary search unit 190 carries out trial quantizations at quantization levels just above or just below the base quantization level, again modified by the quantisation index offsets associated with each block, to select one value within a range of −3 to +4 with respect to the base quantization level from the bit allocator.

A further trial quantization is carried out by the backsearch unit which tests the quantization level selected by the binary search unit 190, and assesses whether a higher quantization level could be used whilst still obtaining the same or fewer quantisation errors.

Finally, the selected quantization level, and the DCT blocks from the further DCT encoder 180, are supplied to a quantizer 210 where they are quantized according to the selected quantization level. The quantized data are passed to an entropy encoder 220 which generates variable length output data according to the standard principles of entropy encoding, so that more commonly occurring data patterns in the quantized data are encoded using shorter code words.

The data generated by the entropy encoder is then packed into "code blocks" for recording on tape by a data packer 230. The code blocks include header data, entropy-encoded data from a number of DCT blocks, activity codes associated with those blocks and an indication of the quantisation level used in forming the blocks. Error correcting codes are then applied to provide error correction when the code blocks are replayed from the tape. A code block comprises five "sync blocks", where a sync block is the smallest separately recoverable data item recorded on the tape in this system. A sync block is illustrated schematically in FIG. 13 and is described further below.

Figure 5:
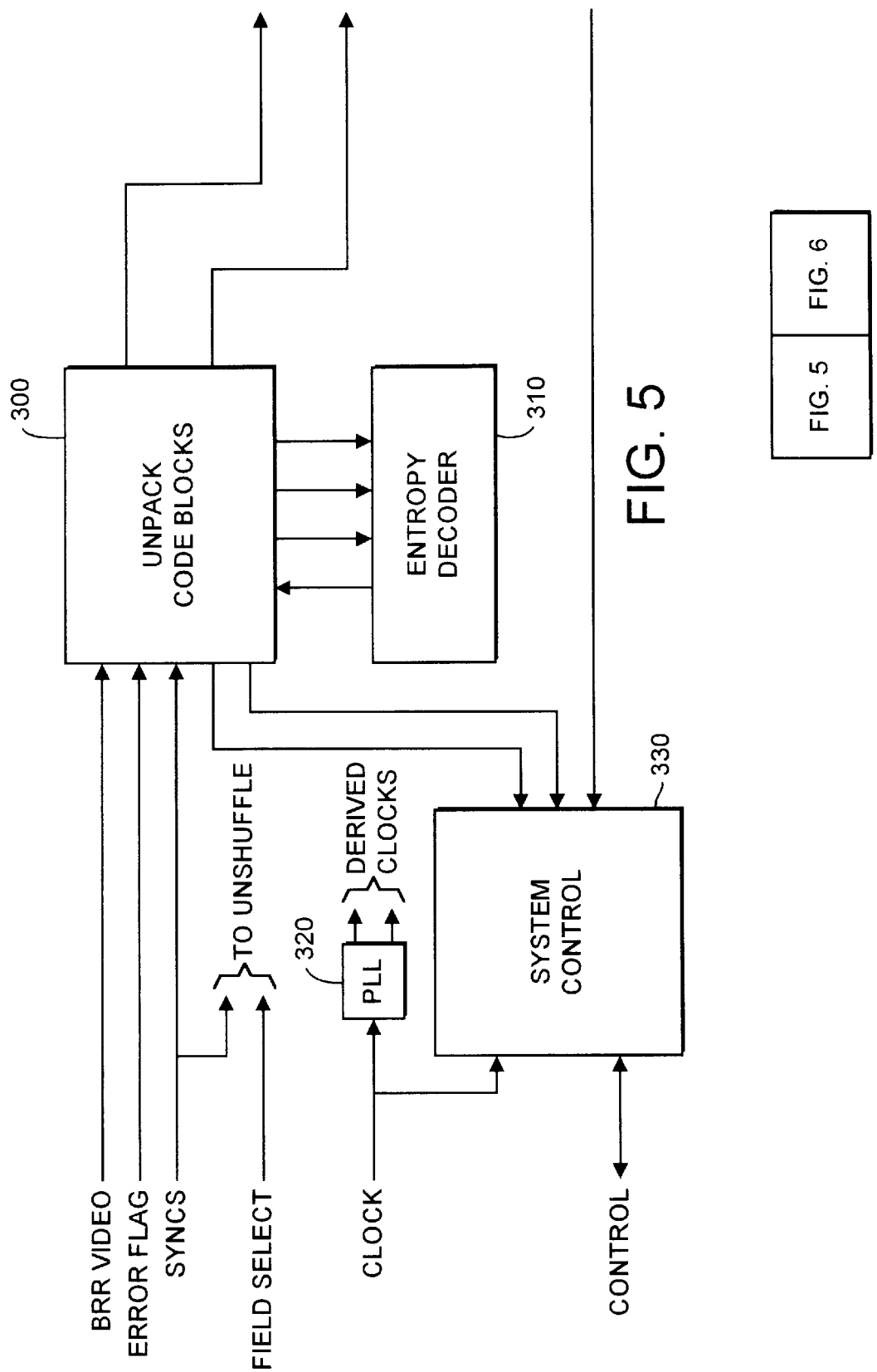
FIGS. 5 and 6 schematically illustrate the corresponding decoder of FIG. 1.
Figure 6:
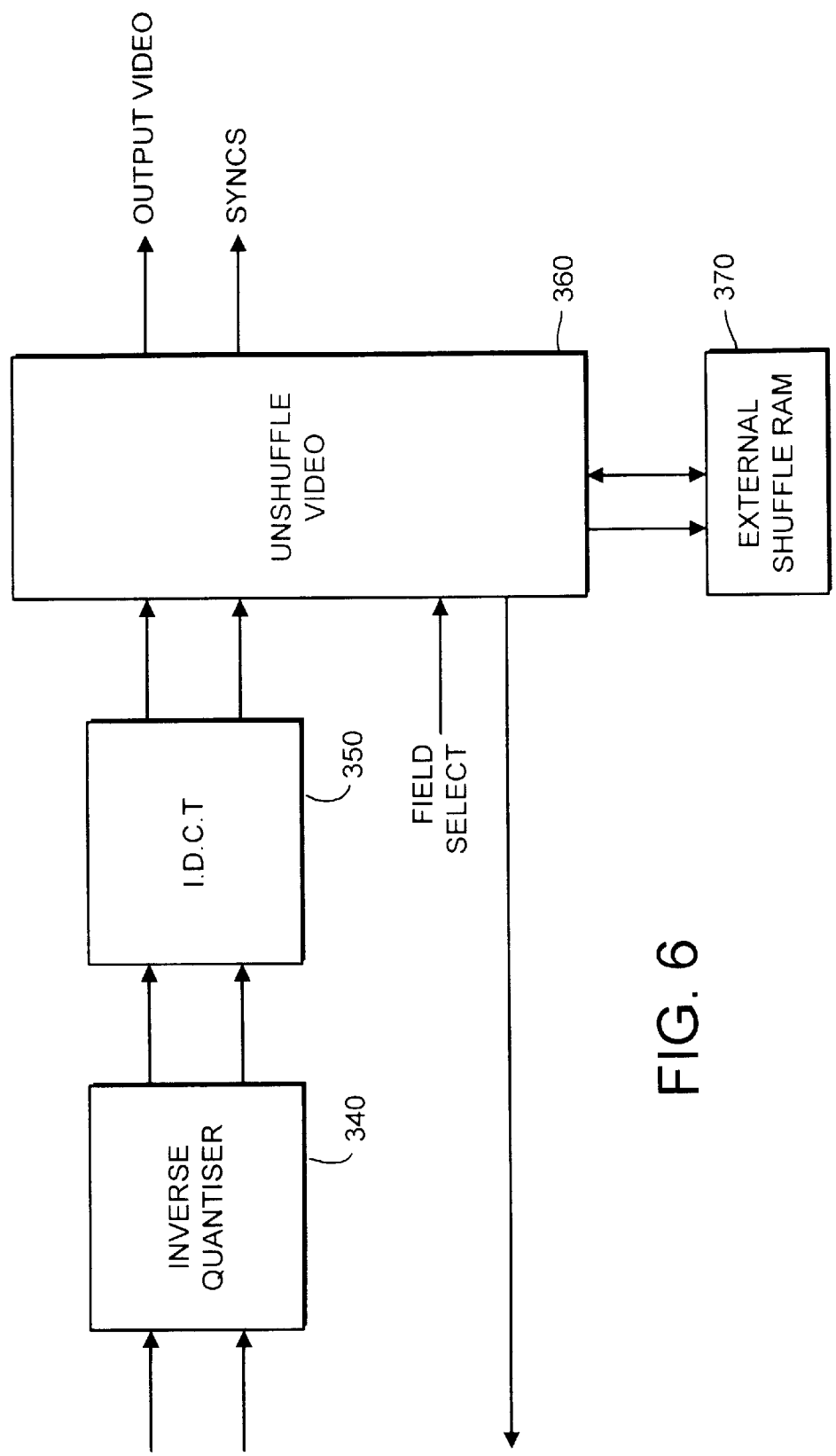

FIGS. 5 and 6 schematically illustrate the structure of the decoder 40 of FIG. 1.

Figure 4:
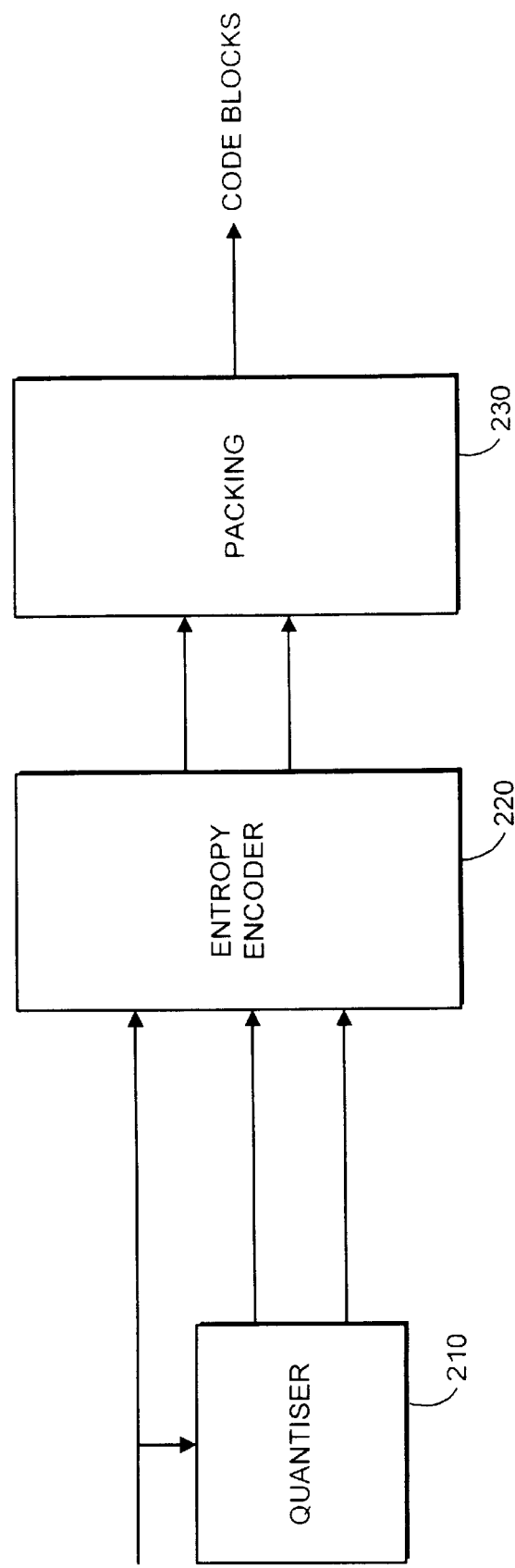

The bit-rate reduced (BRR) video, an error flag indicative of a data error in the BRR signal and horizontal and frame sync pulses are supplied to an unpacker 300. This operates in a complementary manner to the packer 230 of FIG. 4, to unpack individual DCT blocks (as entropy encoded) from the code blocks recovered from the tape. The unpacker forwards the entropy encoded data unpacked from the code blocks to an entropy decoder 310 where the DCT data is recovered.

A phase lock loop 320 receives a clocking signal associated with the input data and derives other clocking signals required by other parts of the decoding apparatus.

A system controller 330 controls the operation of the apparatus as described herein.

Turning now to FIG. 6, the entropy decoded DCT blocks are supplied to an inverse quantizer 340 where an inverse quantizing operation is carried out. The output from the inverse quantizer is supplied to an inverse DCT unit 350 where an inverse DCT operation is performed.

This generates blocks of image data, but in the shuffled order (by virtue of the shuffler 120 on the encoder 10. Therefore, an unshuffler 360 is used to recreate the correct image order of the pixel blocks. This is carried out by writing the pixel data to an external shuffle RAM 370 during one field or frame, and then reading it out in the correct order during the next field or frame. The output of the unshuffler 360 forms the output video signal and an associated sync signal.

Figure 7:
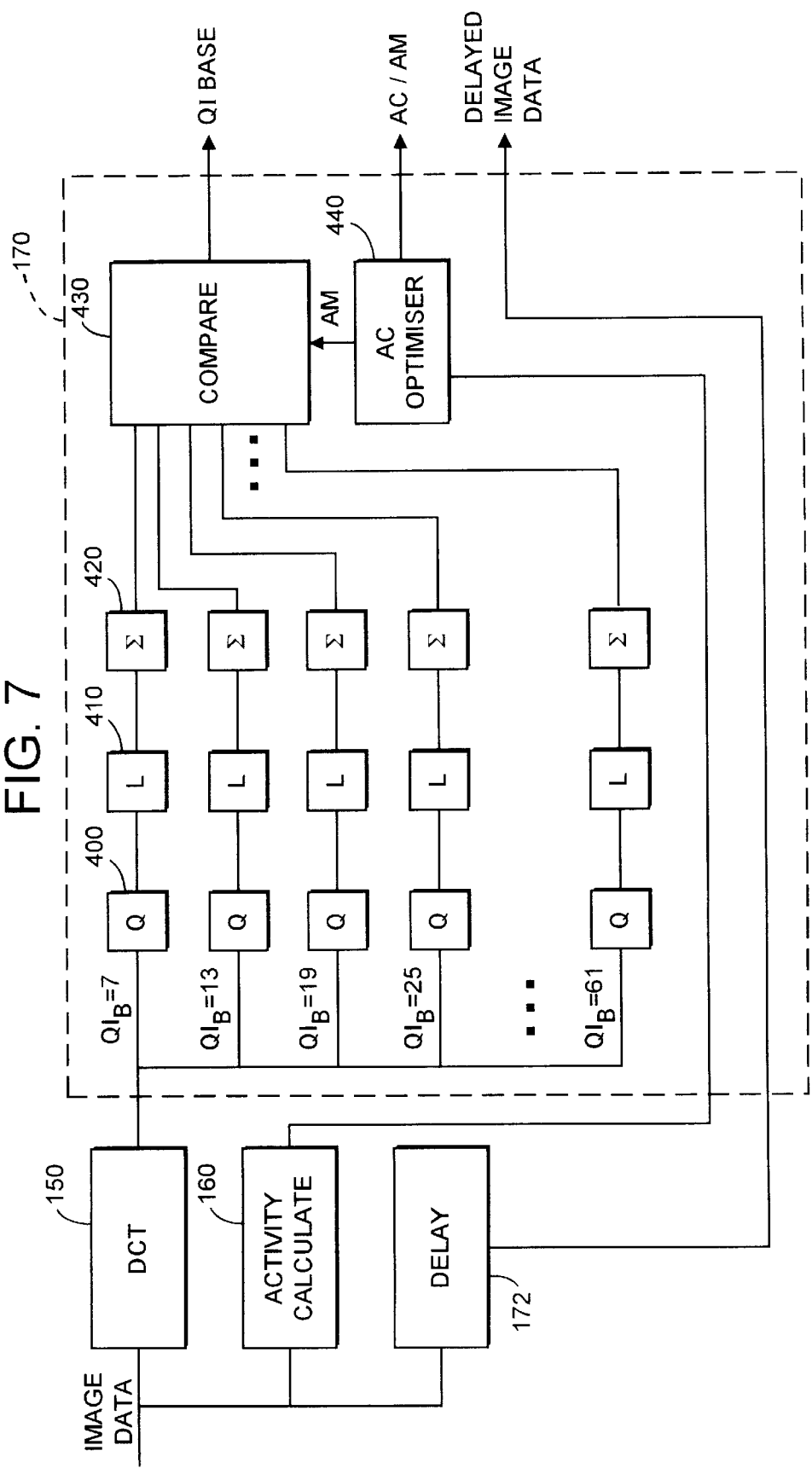
FIG. 7 schematically illustrates a bit allocator in more detail.

Referring now to FIG. 7, the operation of the bit allocator 170 will now be described in more detail.

The bit allocator 170 receives blocks of image data from the shuffler 120, DCT encoded data blocks from the DCT unit 150, and activity codes with an associated activity mode from the system controller. Activity modes and activity codes will be described in detail below with reference to FIGS. 8 and 9.

A delay unit 172 is provided (actually by the shuffler reading data later from the external shuffle RAM) for delaying the image data by the processing time of the bit allocator. Delayed image data is supplied for processing by later stages of the apparatus of FIG. 1, once the trial quantisation process of the bit allocator has been completed.

The DCT blocks are supplied in parallel to a number of processing chains each comprising a trial quantiser 400, a length calculator 410 and a bit summer 420. Each of the processing chains carries out a trial compression of each DCT block according to one of ten quantization "base" values: 7, 13, 19, 25, 31, 37, 43, 49, 55 and 61. The results of each trial quantisation are supplied to the respective length calculator 410. This carries out a part of the processing associated with entropy encoding, in that it calculates the number of bits which would be required to entropy-encode that quantised data. These numbers of bits are summed by a summer for all of the DCT blocks within a code block. As mentioned above, a code block comprises five sync blocks, and a sync block, as illustrated in FIG. 13, is a data unit for recording onto tape, and comprises 9 luminance DCT blocks and 6 chrominance DCT blocks (3 Cb; 3 Cr).

After all of the DCT blocks of one code block have been processed in this way, the summed numbers of bits from the ten respective summers 420 are supplied to a comparator 430. This adds the amount of data needed to encode the activity codes for the DCT blocks (see below) to the outputs of the summers 420, and selects that value of the base quantisation level ($QI_{base}$) which gives a quantity of coded data nearest to but under the target size of a code block. That value of $QI_{base}$ is passed to the binary search unit and the backsearch unit for further processing as described above.

In parallel with the above processing, the optimisation of activity codes is being performed.

The apparatus can operate in one of four activity "modes", which determine the amount of data made available to specify the activity level of each DCT block. These activity modes are shown in FIG. 8, and vary from a mode in which no data is made available to specify the activity levels (AM=00) to one in which 3 bits per DCT block are made available (AM=11).

So, in AM=11, there are eight possible activity values which can be encoded by corresponding activity codes (AC). The effect of these activity values on the quantisation level used for the corresponding DCT block is illustrated in FIG. 9. Referring to FIG. 9, it can be seen that in AM=11, the actual quantisation applied to the DCT block can be modified by up to ±14 (on a scale—before modification by image activity—of about 1 to 64).

The initially selected activity mode is set by the user. The actual quantisation index offsets used in the activity mode are recorded onto tape as a look-up table, so that tapes recorded using different sets of offsets can be read by the same decoding apparatus.

In AM=10, two bits are available for each AC, so up to four values can be encoded. These values are not necessarily those shown for AC=0, 1, 2 and 3 in FIG. 9, but can be any values such as ±14 and ±6. Whatever the initially selected AM, a look-up table giving the correct quantisation index offsets to be used under that AM is written to tape—in fact, six times per frame.

Similarly, in AM=01, the available ACs are AC=0 and 1. In AM=00, only AC=0 is available.

The initial AM value is set by the user, and is used by the activity calculator 160 in generating activity codes to be associated with each DCT block. These codes will have 0, 1, 2 or 3 bits depending on the initially selected AM.

FIG. 10 illustrates the final quantiser 210 in more detail, and shows that the quantiser 210 receives the DCT data from the DCT unit 180, a quantisation base value from the backsearch unit 200 and the quantisation index offset (derived from the bitstream) for a current block. The AC and the $QI_{base}$ values are combined in a Q Index calculator 212, where the addition or subtraction specified for each AC by the table of FIG. 9 is carried out. The resulting quantisation value Q is applied to the DCT data by a quantiser unit 214.

The ACs are not used in the trial quantisation process carried out by the bit allocator 170. This allows the process of so-called AC optimisation to be carried out in parallel to the trial quantisations.

The ACs and the AM are supplied to an AC optimiser 440. The AM may be supplied explicitly or may be implied from the length of the ACs.

The AC optimiser is illustrated in more detail in FIG. 11.

The AC and AM values are received by a maximum AC detector 442 and an AM selector 444. The maximum AC detector detects (for Y, Cb and Cr blocks separately) the maximum AC value for that sync block. This information is passed to the AM selector which detects whether the number of bits required to encode that maximum value is fewer than the number of bits allowed by the current AM, and in fact is within the allocated number of bits of a lower AM. If this is true then the AM selector replaces the initially selected AM for that sync block with a replacement, lower AM. Also, the n-bit ACs prepared under the initially selected AM are replaced with m-bit ACs, where m<n. Effectively this is done by the entropy encoder ignoring one or more most significant bits of the ACs.

In fact, although a lower order AM is specified, resulting in a saving of one or more bits per DCT block in recording the ACs, the look-up table used to decode the ACs into quantisation index offsets will be the same as the look-up table for the initially selected AM. So, a two-bit AC under the initially selected AM=10 might well represent a quite different quantisation index offset to the same two bit AC under an AM that has been optimised from AM=11 down to AM=10, because in the latter case the look-up table for AM=11 will still be used.

Figure 12:
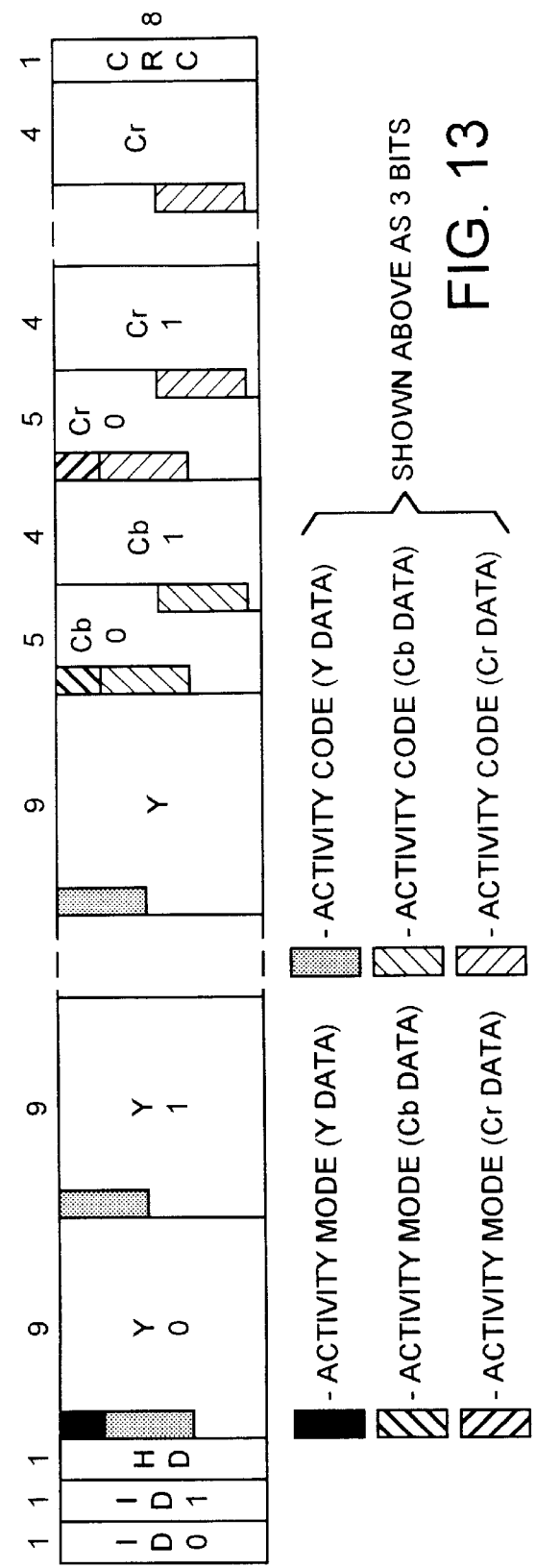
FIG. 12 schematically illustrates an optimisation process.

FIG. 12 is a table schematically illustrating the AC optimisation process. The left-hand column of FIG. 12 lists the initial AM value. If the maximum AC value detected by the maximum AC detector 442 is one of the values shown in the centre column, then the AM for that sync block can be replaced by the "optimised" AM shown in the right-hand column, and the ACs encoded using fewer bits. Over a whole sync block, the savings made by this technique can provide a considerable extra amount of data capacity for encoding the image data itself.

FIG. 13 schematically illustrates a sync block, showing header information ("ID0", "ID1", "HD"), luminance DCT blocks (Y0, Y1 . . . ), chrominance DCT blocks (Cb0, Cb1 . . . Cr0, Cr1 . . . ) and an error checking byte ("CRC"). The AMs for Y, Cb and Cr are specified separately, at the beginning of respective Y, Cb and Cr data sections of the sync block. The ACs for each Y, Cb and Cr DCT block are then specified at the beginning of that DCT block's data.

Figure 14:
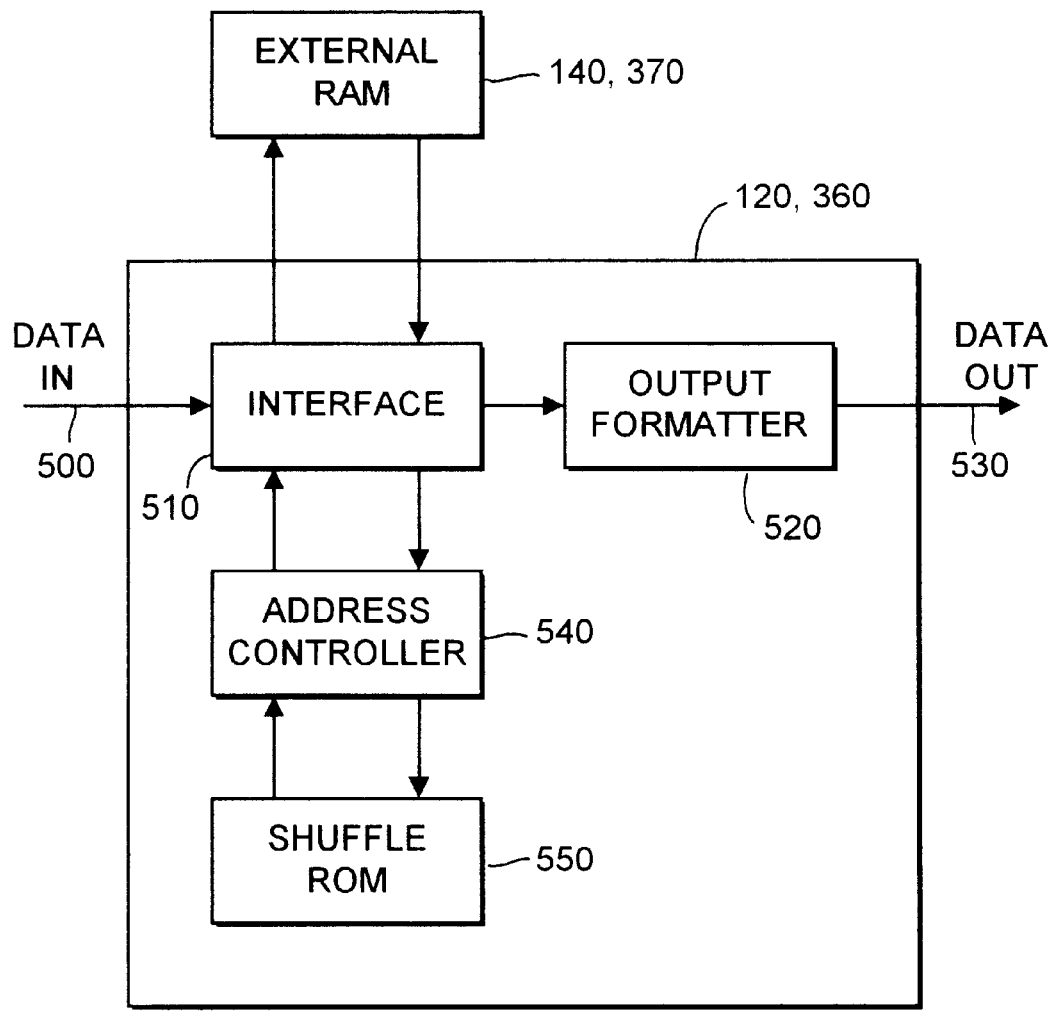
FIG. 14 is a schematic diagram of a shuffler or an unshuffler.

FIG. 14 is a schematic diagram of the shuffler 120 or the unshuffler 360 (both work in a similar manner at this schematic level). In the case of the shuffler 120, the shuffler is connected to the external RAM 140; in the case of the unshuffler 360, the unshuffler is connected to the external RAM 370.

For simplicity, the following description will relate to the shuffler 120.

The shuffler receives input data from the subsampler and demultiplexer 5 on a input terminal 500. The input data is passed to an interface 510 from where it is written to the external RAM 140. Input video data from a current frame is written to the external RAM 140 while data from a preceding frame is read out, in a shuffled manner, from the external RAM 140. Therefore, the data being read out, in the shuffled manner, is passed back to the interface 510 from the external RAM 140 and from there to an output formatter 520 to give the output data signal 530.

The interface 510 and the external RAM 140 are under the control of an address and timing controller 540, which in turn selects addresses from which data is to be read with reference to a shuffle ROM 550. The way in which the address controller generates addresses for reading data from the external RAM 140 will be described below.

Figure 15A:
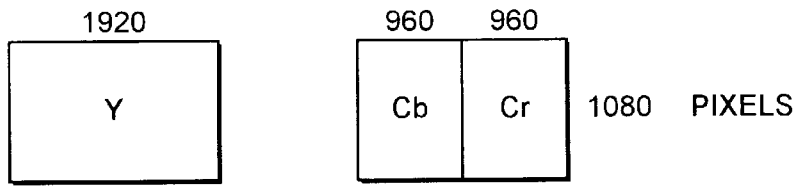
FIGS. 15a to 15d schematically illustrate the operation of a data subsampler and demultiplexer.
Figure 15B:
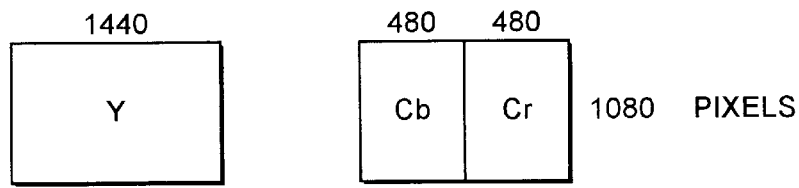
Figure 15C:
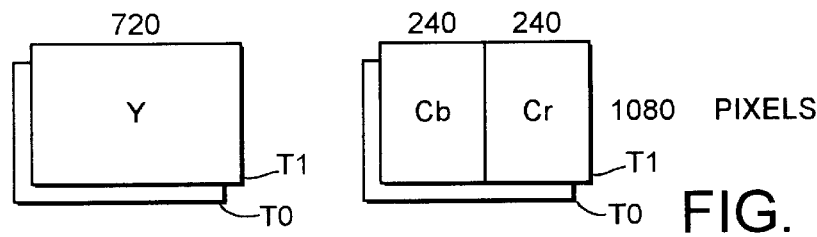
Figure 15D:
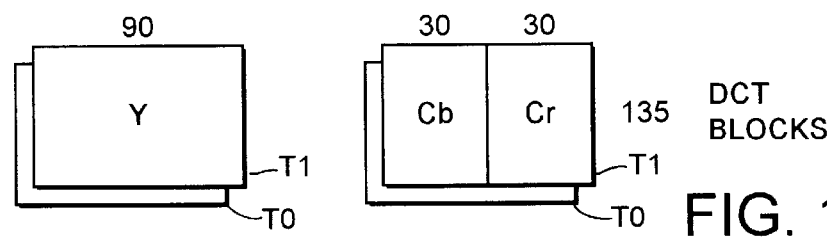
Figure 15E:
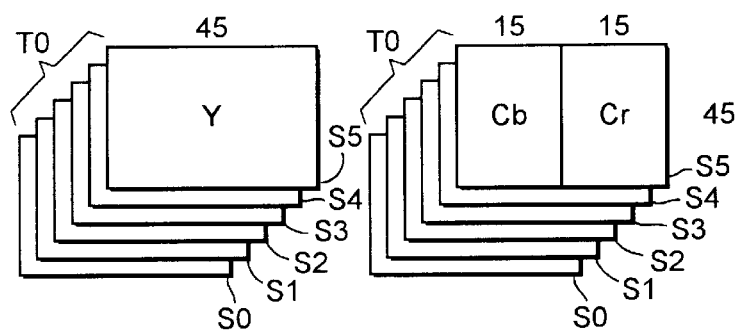
FIG. 15e schematically illustrates part of the operation of a data shuffler.

FIGS. 15a to 15d schematically illustrate the operation of the data subsampler and demultiplexer 5, and FIG. 15e schematically illustrates part of the operation of the data shuffler 140.

FIG. 15a illustrates an incoming video frame in the so-called 4:2:2 format, having 1920 luminance pixels horizontally by 1080 pixels vertically. Each of the chrominance components Cb and Cr comprises 960 pixels horizontally by 1080 pixels vertically.

FIG. 15b illustrates the frame of FIG. 15a subsampled to the so-called 3:1:1 format. This reduces the number of luminance pixels horizontally by a factor of three quarters and the number of chrominance pixels of each component horizontally by a factor of a half. The number of vertical pixels is unchanged.

FIG. 15c illustrates the 3:1:1 format frame of FIG. 15b, divided into two portions T0, T1 for separate processing by the respective encoders 10, 12. Each of the two data portions T0, T1 comprises 720 luminance pixels horizontally by 1080 vertically, and 240 horizontal pixels of each chrominance component Cb, Cr by 1080 vertically.

FIG. 15d illustrates the same quantity of data as FIG. 15c, but expressed in terms of DCT blocks of 8×8 pixels. Therefore, each of the two luminance data portions T0, T1 comprises 90 by 135 DCT blocks, and each of the chrominance components comprises 30 by 135 DCT blocks.

FIG. 15e schematically illustrates part of the operation of the data shuffler 140, as applied to one of the two data portions illustrated in FIG. 15e. Therefore, for the luminance component, one data portion of 90 by 135 DCT blocks is transformed into six so-called segments S0 . . . S5, each of 45 by 45 DCT blocks. Similarly, the chrominance data portion of 60 DCT blocks by 135 blocks (for Cb and Cr considered together) is transformed into six segments of 30 blocks by 45 blocks.

In forming the two data portions of FIG. 15c from the data of FIG. 15b, alternate pixels are applied to each of the two data portions. However, in contrast, when the shuffler 140 prepares the six segments S0 to S5 from one of the data portions of FIG. 15d, DCT blocks from the data portion T0, DCT blocks are taken from many different positions across the data portion T0 to form a single segment. This process will be described in detail below.

FIGS. 16a to 16d are schematic timing diagrams illustrating the recording of compressed image data signals onto the tape medium.

FIG. 16a schematically illustrates frame boundaries in the recorded data. Each frame is recorded by 12 tracks on the tape, using the following head order per frame:

$$A\ B\ C\ D\ A\ B\ C\ D\ A\ B\ C\ D$$

In one frame, data supplied to heads A and C comes from the data portion T0, and data supplied to the heads B and D comes from the data portion T1. In the next frame this pattern is inverted—as shown in FIG. 16c.

As shown in FIG. 16b, the shuffle pattern applied to the data is inverted every frame. In brief, different shuffle patterns are applied to the data from data portions T0 and T1, and at each frame boundary the shuffle patterns applied to T0 and T1 are swapped so that, in a particular frame, portion T1 is shuffled using the shuffle pattern applied to portion T0 in the preceding frame.

Figure 17:
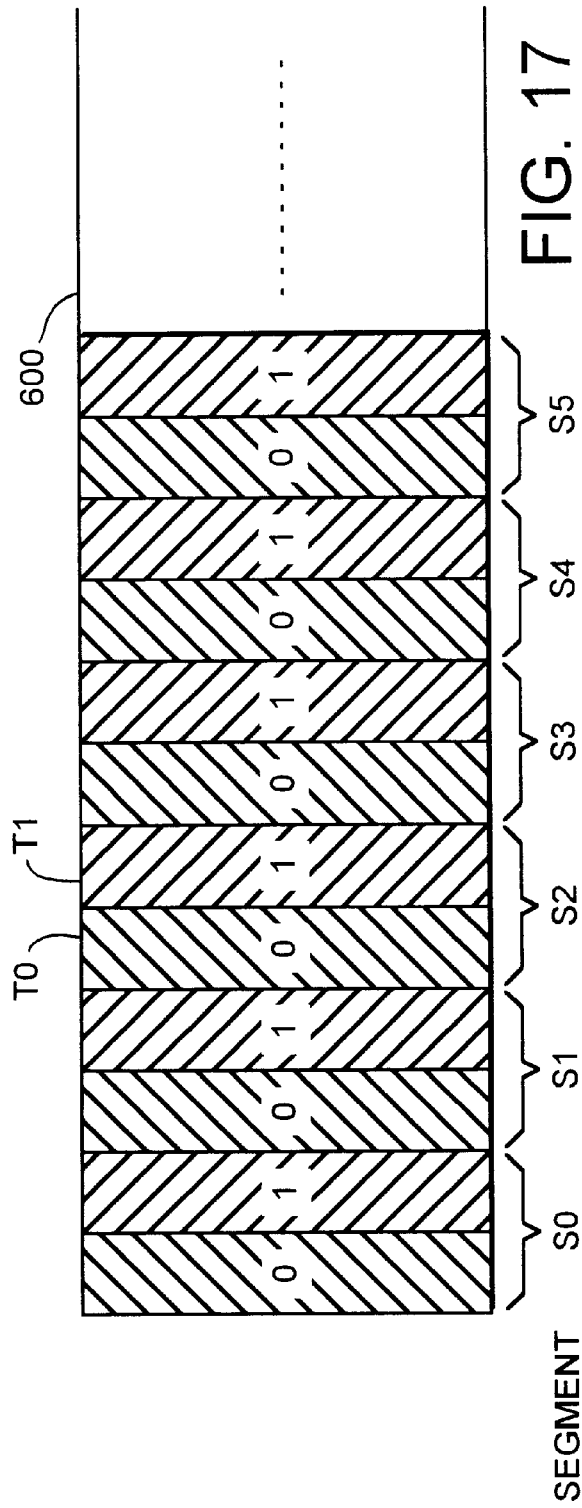
FIG. 17 is a schematic diagram of a tape medium illustrating the track format and azimuth.

FIG. 17 is a schematic diagram of a tape medium 600 illustrating the track format and azimuth.

In actual fact, it will be appreciated that the tracks illustrated in FIG. 17 would be slanted with respect to edges of the tape medium 600 through the use of a helical scan arrangement. They are shown as perpendicular tracks for clarity of the diagram.

Within a single frame, the segments are recorded sequentially, each segment taking two tracks of the tape. So, comparing FIGS. 16a to 16d and FIG. 17, it can be seen that segment S0 is recorded on two tracks of opposite azimuth by heads A and B; segment S1 is recorded on the next two tracks again of opposite azimuth by heads C and D.

The two tracks on which each segment is recorded corresponds to the part of the segment derived from data portion T0 and the part of the segment derived from data portion T1.

Figure 18B:
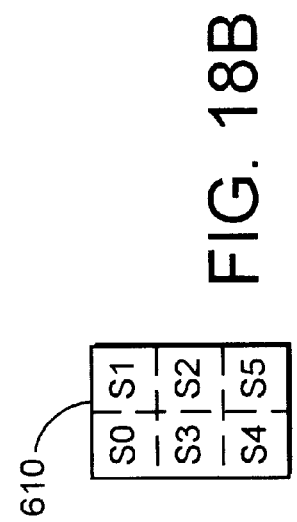
FIG. 18b schematically illustrates a group of six DCT blocks.

FIG. 18a schematically illustrates the division of the two data portions T0 and T1 into segments, and FIG. 18b schematically illustrates a group of six DCT blocks.

Referring to FIG. 18a, the data portion T0, T1 are subdivided into groups 610 of six DCT blocks. An example of such a group is illustrated in FIG. 18b. Each group is an array of two DCT blocks horizontally by three DCT blocks vertically.

Within each group 610, the six DCT blocks are individually assigned to the six respective segments S0 . . . S5. This is illustrated by labels S0 . . . S5 in FIGS. 18a and 18b.

Within an array of six of the groups 610, indicated by bold lines in FIG. 18a, the arrangement of labels S0 . . . S5 varies from group to group according to six predetermined patterns. These patterns ensure that a DCT block assigned to an even numbered segment is never adjacent (horizontally or vertically) to a DCT block assigned to another even numbered segment.

When the segments are being assembled, the shuffler selects groups 610 from various position within the data portion T0 or T1 as appropriate, and reads out the appropriate DCT block from the selected group according to the number of the segment which is being assembled. So, if part of the segment S0 is being assembled, the shuffler would read out the DCT block labelled as S0 from whichever group is currently selected by the shuffler.

Figure 19:
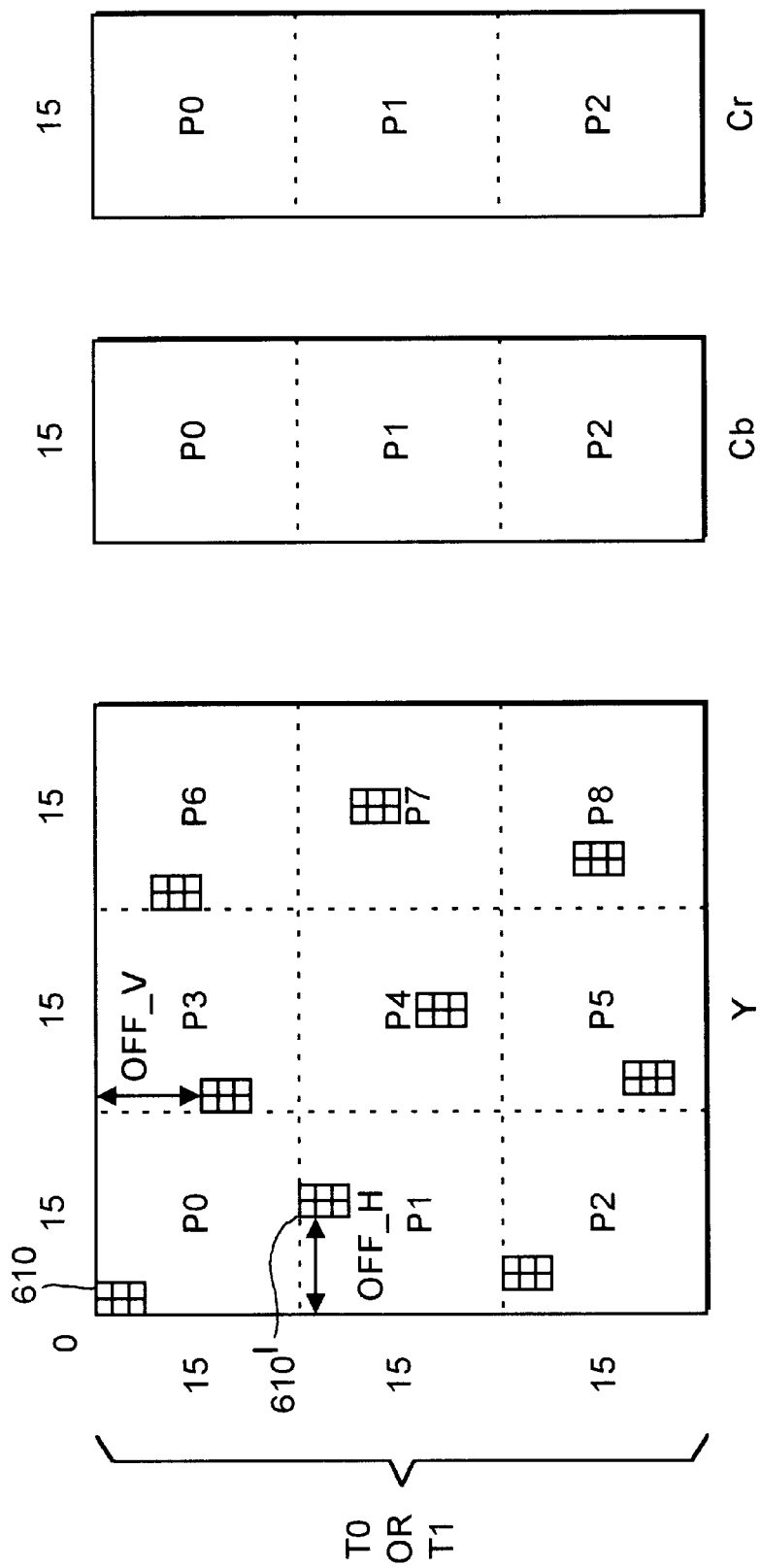
FIG. 19 schematically illustrates the way in which DCT blocks are taken from the arrangement of FIG. 18 to generate a sync block.

FIG. 19 schematically illustrates the way in which groups 610 are selected by the shuffler 140.

The data portions T0 or T1 (and only one data portion is illustrated in FIG. 19) are divided into nine subsections P0 . . . P8 for luminance and three subsections P0 . . . P2 for each of the chrominance components. Each of the subsections is 15×15 of the groups 610, each group having six DCT blocks labelled S0 . . . S5.

As mentioned above, a sync block comprises nine luminance DCT blocks and six chrominance DCT blocks, three from each component. Therefore, in order to assemble a sync block to form a part of a particular segment, one DCT block is taken from each of the nine luminance areas P0 . . . P8, one DCT block is taken from each of the three Cb areas P0 . . . P2 and one DCT block is taken from each of the Cr area P0 . . . P2.

In order to select the appropriate group 610 from which a DCT block is to be taken to form part of the currently assembling sync block, the following equations are used:

For area P0:

$$\begin{aligned}
tmp1 &= (SPRIM \times a)\ \%\ (SPIXCEL \times SLINE) \\
h0 &= (START + tmp1)\ \%\ SPIXCEL \\
v0 &= ((START + tmp1)/SPIXCEL)\ \%\ SLINE
\end{aligned}$$

For area P1:

$$\begin{aligned}
tmp2 &= (OFF\_H + tmp1)\ \%\ (SPIXCEL \times SLINE) \\
h1 &= tmp2\ \%\ SPIXCEL \\
v1 &= ((tmp2/SPIXCEL)\ \%\ SLINE) + 15
\end{aligned}$$

For area P2:

$$\begin{aligned}
tmp2 &= (OFF\_H \times 2 + tmp1)\ \%\ (SPIXCEL \times SLINE) \\
h2 &= tmp2\ \%\ SPIXCEL \\
v2 &= ((tmp2/SPIXCEL)\ \%\ SLINE) + 30
\end{aligned}$$

For area P3:

$$\begin{aligned}
tmp2 &= (OFF\_V \times 15 + tmp1)\ \%\ (SPIXCEL \times SLINE) \\
h3 &= (tmp2\ \%\ SPIXCEL) + 15 \\
v3 &= (tmp2/SPIXCEL)\ \%\ SLINE
\end{aligned}$$

For area P4:

$$\begin{aligned}
tmp2 &= (OFF\_H + (OFF\_V \times 15) + tmp1)\ \%\ (SPIXCEL \times SLINE) \\
h4 &= (tmp2\ \%\ SPIXCEL + 15) \\
v4 &= ((tmp2/SPIXCEL)\ \%\ SLINE) + 15
\end{aligned}$$

For area P5:

$$\begin{aligned}
tmp2 &= ((OFF\_H \times 2) + (OFF\_V \times 15) + tmp1)\ \%\ (SPIXCEL \times SLINE) \\
h5 &= (tmp2\ \%\ SPIXCEL) + 15 \\
v5 &= ((tmp2/SPIXCEL)\ \%\ SLINE) + 30
\end{aligned}$$

For area P6:

$$\begin{aligned}
tmp2 &= (OFF\_V \times 30 + tmp1)\ \%\ (SPIXCEL \times SLINE) \\
h6 &= (tmp2\ \%\ SPIXCEL) + 30 \\
v6 &= (tmp2/SPIXCEL)\ \%\ SLINE
\end{aligned}$$

For area P7:

$$\begin{aligned}
tmp2 &= (OFF\_H + (OFF\_V \times 30) + tmp1)\ \%\ (SPIXCEL \times SLINE) \\
h7 &= (tmp2\ \%\ SPIXCEL) + 30 \\
v7 &= ((tmp2/SPIXCEL)\ \%\ SLINE) + 15
\end{aligned}$$

For area P8:

$$\begin{aligned}
tmp2 &= ((OFF\_H \times 2) + (OFF\_V \times 30) + tmp1)\ \%\ (SPIXCEL \times SLINE) \\
h8 &= (tmp2\ \%\ SPIXCEL) + 30 \\
v8 &= ((tmp2/SPIXCEL)\ \%\ SLINE) + 30
\end{aligned}$$

In the above equations,

SPIXCEL is the size of one area measured as a number of groups 610.

SLINE is the horizontal size of one area measured as a number of groups 610.

START is a variable dependent on which track is being prepared—see table 1 below.

OFF_H and OFF_V are horizontal and vertical offset amounts, shown schematically on FIG. 19.

The % symbol signifies a modulus operation, so that a % b represents the value of a modulo b. The variables hn and vn (where n varies from 0 to 8) signify the positions of the selected block within the data portion T0 or T1, addressed by the number of groups 610 from the top left hand corner of the array. The additions of 15 and/or 30 to various ones of the hn and vn are to give an offset from the top left hand corner into the correct part of the array.

The variable START varies from segment to segment, and between the data portions T0 and T1. Details of the variable START are given in a table below and will be described further then.

One example of selection pattern generated by the above equations is illustrated by the blocks 610 shown in the luminance section of FIG. 19. So, in this example, the first luminance DCT block (Y0) is taken from a group 610 in the upper left-hand corner of area P0. DCT block Y0 is taken from a group 610' in a position in the area P1 offset horizontally from the position of the group 610 in the area P0. The process continues with further offsets being applied as shown in FIG. 19.

The count "a" in the above equations is then incremented and a further set of blocks is read according to a further pattern. The equations are arranged so that in the course of 225 (15×15) iterations, all of the groups 610 within each 15 by 15 area P0 . . . P8 will be selected.

The equations relating to P0 . . . P2 above are also applied to the chrominance areas for each component.

Figure 20:
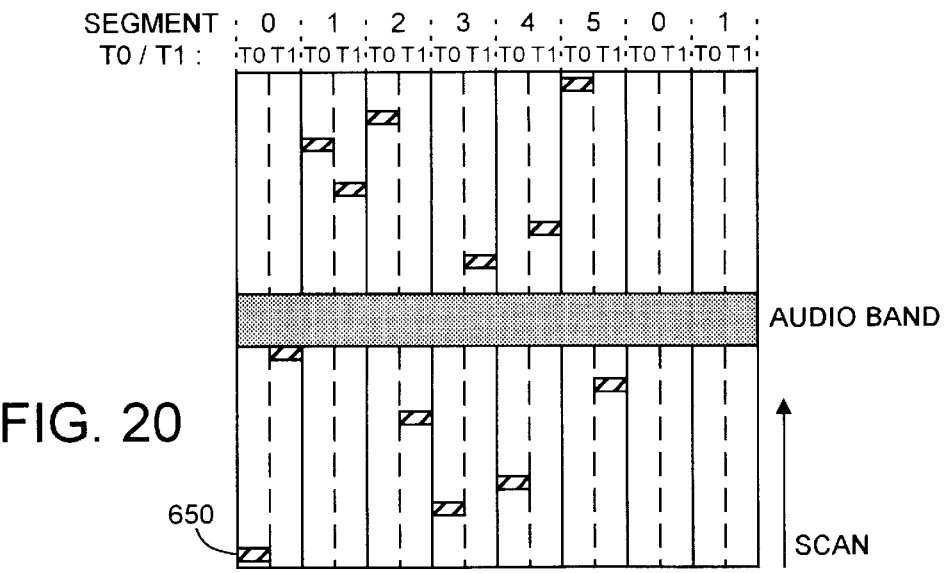
FIG. 20 schematically illustrates the way in which sync blocks are recorded on the tape medium.

FIG. 20 and Table 1 below illustrate the way in which the variable START is altered from track to track on the tape medium.

described above. In the example shown in FIG. 21a, the signal from head A is lost or degraded through tape errors, head clogging or other causes. This introduces errors into diagonally adjacent blocks of each frame, which therefore gives valid pixel data horizontally and vertically adjacent to the erroneous pixel data to allow concealment to take place. Also, because the shuffle pattern is inverted from frame to frame, data which is erroneous in one frame is surrounded by two frames of correct data at the same spatial position, allowing temporal concealment to be used.

Finally, FIGS. 22a to 22e illustrate the situation where two heads of a head pair are providing erroneous data. In the example shown in FIG. 22a, heads A and B are providing erroneous data.

The result, as shown in FIGS. 22b to 22e, is that within a single frame, the errors occur in DCT blocks in complementary positions between the data portions T0 and T1, therefore providing some good data at each position to allow spatial concealment to be used. Also, as described above, from frame to frame the concealment pattern is inverted, so that temporal concealment is also possible.

A further feature is as follows. If the tape is damaged by a scratch or similar fault running across the tape but less than 115 sync blocks (23 code blocks) in length, concealment can be used by using good data from the other subsampled data portion. This is because of the displacement between the subsampled data streams on the tape—see table 1—which means that corresponding data from, say S0 in T0 and S3 in T1 are displaced by (29−1) code blocks, which is the same as 115 sync blocks if the five audio code blocks are not counted.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video data recording apparatus for recording on successive tracks of a tape recording medium video data

TABLE 1

| Segment | 0 | | 1 | | 2 | | 3 | | 4 | | 5 | |
|---|---|---|---|---|---|---|---|---|---|---|---|---|
| Track | 0 | 1 | 0 | 1 | 0 | 1 | 0 | 1 | 0 | 1 | 0 | 1 |
| position of 1st CB | 1 | 21 | 42 | 35 | 45 | 15 | 4 | 29 | 7 | 32 | 48 | 18 |
| no of CB at track start | 44 | 24 | 8 | 15 | 5 | 30 | 41 | 21 | 38 | 18 | 2 | 27 |
| variable "START" | 35 | 60 | 170 | 150 | 50 | 75 | 140 | 165 | 20 | 45 | 155 | 180 |

In FIG. 20, the tracks are recorded from the bottom of the diagram to the top of the diagram. An audio band of five code blocks (25 sync blocks) is recorded around the centre of the tape. A shaded portion 650 in each track indicates the position within the track of the "first" sync block, i.e. the sync block containing a DCT block from the group 610 at the top left position in the array of FIG. 18a. These positions are reflected in the third line of Table 1 (position of first Cb), which gives the position in terms of a code block number (a code block comprises five sync blocks).

Table 1 also indicates the number of the code block at the start of the track (the bottom of the diagram).

These features are determined by the change in the variable "START" from track to track. They result in a predetermined offset between DCT blocks in adjacent tracks from the same group 610.

Figure 21A:
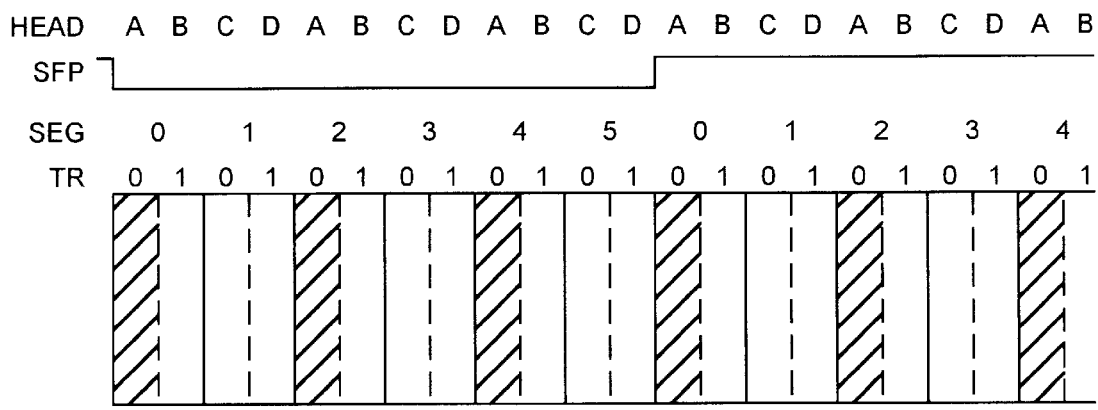
FIGS. 21a to 21c schematically illustrate the response of the system to the loss of signal from one tape replay head channel.
Figure 21B:
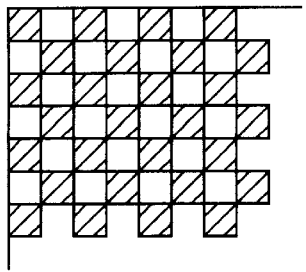
Figure 21C:
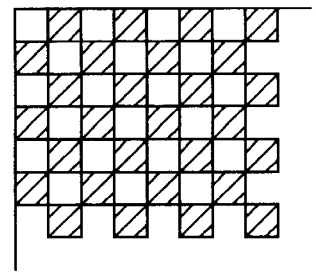
Figure 22A:
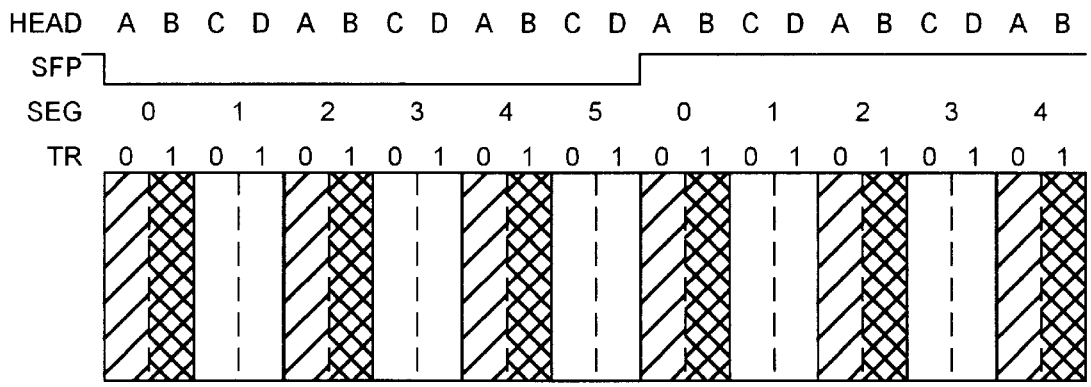
FIGS. 22a to 22e schematically illustrate the response of the system to the loss of signal from a pair of tape replay head channels.
Figure 22B:
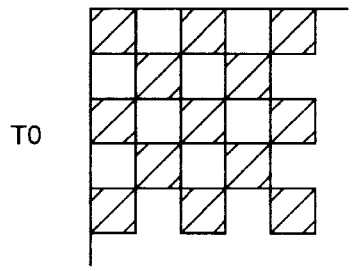
Figure 22C:
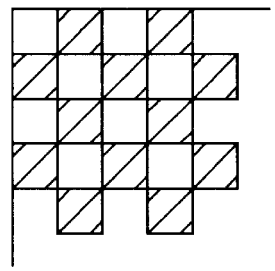
Figure 22D:
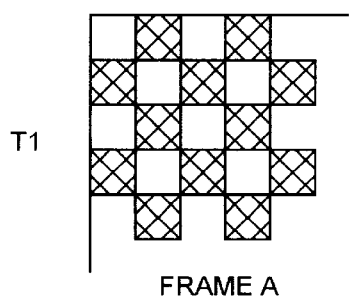
Figure 22E:
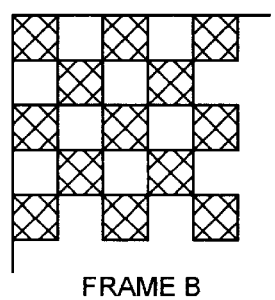

FIGS. 21a to 21c illustrate the effect of the loss of signal from one tape replay head channel using the shuffle pattern representing successive video images, such that each said image occupies a predetermined plurality of successive tracks said apparatus comprising:

a demultiplexer for demultiplexing input video data into two or more data streams, each said data stream being comprised of pixels from said images;

a shuffle memory for storing said data streams output from said demultiplexer;

a data shuffler for reading blocks of pixels from said shuffle memory according to one of a predetermined plurality of shuffle patterns so that blocks of pixels which are adjacent in said images are not read out at adjacent positions in the shuffle pattern; said shuffle patterns being interchanged between said data streams for each successive image of said video data; and a tape recording system in which shuffled data output from said data shuffler is recorded on successive parallel tracks of said tape recording medium, each track being comprised of successive sync blocks; such that neighboring input image pixels are not recorded on successive sync blocks or adjacent tracks of said recording medium.

2. Apparatus according to claim 1, in which said demultiplexer is operable to demultiplex input video data into two data streams each comprised of alternating pixels of said images, such that each said data stream is recorded on alternate tracks of said tape recording medium.

3. Apparatus according to claim 2, in which said tracks for recording each of said two data streams are recorded with different respective track azimuths.

4. Apparatus according to claim 2, in which said shuffler is operable to apply different shuffling patterns to said two data streams, said shuffling patterns applied to said two data streams being interchanged between said data streams for each successive image of said video signal.

5. Apparatus according to claim 1, comprising a data compressor for data compressing said video data shuffled by said data shuffler.

6. Apparatus according to claim 1, in which each track for a recorded image is occupied by data from a plurality of sub-areas of said image in a predetermined cyclic order of sub-areas, the start of said cyclic order on each track being offset by a predetermined amount from the start of said cyclic order on an adjacent track.

7. A method of recording video data representing successive video images, in which video data is recorded on successive tracks of a tape recording medium, video data representing each image occupying a predetermined plurality (n) of successive tracks, said method comprising the steps of:

demultiplexing input video data into two or more data streams, each said data stream being comprised of pixels from said images;

storing said demultiplexed data streams;

shuffling the stored data by reading blocks of pixels from the stored data streams according to one of a predetermined plurality of shuffle patterns, so that blocks of pixels which are adjacent in the image are not read out at adjacent positions in the shuffle pattern; said shuffle patterns being interchanged between said data streams for each successive image of said video data; and recording the shuffled data on successive parallel tracks of said tape recording medium, each track being comprised of successive sync blocks; such that neighboring input image pixels are not recorded on successive sync blocks or adjacent tracks of said recording medium.

8. A magnetic tape storage medium bearing recorded video data representing successive video images, in which:

video data is recorded as two demultiplexed data streams on successive recording tracks, each said data stream being recorded with a different track azimuth, video data representing each image occupying a predetermined plurality (n) of successive tracks; and said data streams being shuffled according to different shuffling patterns interchanged between said data streams for each successive image of said video data; such that video data representing each of a plurality of sub-areas of an image is recorded in respective parts on all n tracks occupied by that image, at respective track positions so that corresponding positions along pairs of adjacent tracks are occupied by data representing different ones of said plurality of sub-areas.

9. Video data recording apparatus for recording video data representing successive video images, said apparatus comprising:

a tape recording system in which video data is recorded on successive tracks of a tape recording medium, video data representing each image occupying a predetermined plurality (n) of successive tracks;

a demultiplexer for demultiplexing input video data into two or more data streams, a data shuffler for shuffling said video data according to a shuffle pattern, for recording on said successive tracks of said tape recording medium, said shuffler being operable to apply different shuffling patterns to said data streams, said shuffling patterns applied to said data streams being interchanged between said data streams for each successive image of said video signal.

10. Apparatus according to claim 9, in which data from each data stream occupies separate respective tracks on said tape medium.

11. Apparatus according to claim 10, in which said demultiplexer is operable to demultiplex said video data into two data streams.

12. A method of recording video data representing successive video images, in which video data is recorded on successive tracks of a tape recording medium, video data representing each image occupying a predetermined plurality (n) of successive tracks; said method comprising the steps of:

demultiplexing input video data into two or more data streams, shuffling said video data according to a shuffle pattern, for recording on said successive tracks of said tape recording medium, said shuffler being operable to apply different shuffling patterns to said data streams, said shuffling patterns applied to said data streams being interchanged between said data streams for each successive image of said video signal.

13. A tape storage medium bearing recorded video data representing successive video images, in which:

video data is recorded as two or more demultiplexed data streams on successive recording tracks, video data representing each image occupying a predetermined plurality (n) of successive tracks; and different shuffling patterns being applied to said data streams, said shuffling patterns applied to said data streams being interchanged between said data streams for each successive image of said video signal.

* * * * *